United States Patent [19]

Mitchell et al.

[11] 4,194,122
[45] Mar. 18, 1980

[54] APPARATUS FOR THE MARKING OF X-RAY FILM

[75] Inventors: Eugene C. Mitchell; Carol J. Mitchell, both of 538 N. Maryland, #2, Glendale, Calif. 91206

[73] Assignee: Eugene Mitchell, Santa Monica, Calif.

[21] Appl. No.: 913,408

[22] Filed: Jun. 7, 1978

[51] Int. Cl.$^2$ .................. G03B 41/16; F16B 47/00
[52] U.S. Cl. ........................... 250/476; 40/594; 248/363
[58] Field of Search ............ 250/476; 40/594, 595, 40/597; 248/363

[56] References Cited

U.S. PATENT DOCUMENTS

| | | | |
|---|---|---|---|
| 2,172,528 | 9/1939 | Auer | 250/476 |
| 3,506,528 | 4/1970 | Dean | 40/594 |
| 4,127,774 | 11/1978 | Gillen | 250/476 |

OTHER PUBLICATIONS

"X-Rite Radio Opaque Label Tape," 2 Page Data Sheet of X-Ray Identification Co., Oct. 1965.

Primary Examiner—Alfred E. Smith
Assistant Examiner—T. N. Grigsby
Attorney, Agent, or Firm—Townsend and Townsend

[57] ABSTRACT

An X-ray film marking device for selectively shielding X-ray film from X-rays so as to imprint identifying characters on the subsequently developed X-ray film. Lead indicia are supported by an X-ray transparent support sheet. The support sheet and therewith the indicia is releasably secured to any suitable structure between the X-ray source and film by a flexible pad having pressure-sensitive coatings of adhesive substances. A tab connected to the support sheet and of a predetermined color for easy association with a particular indicia allows for rapid removal of the marking device.

14 Claims, 3 Drawing Figures

U.S. Patent  Mar. 18, 1980  4,194,122
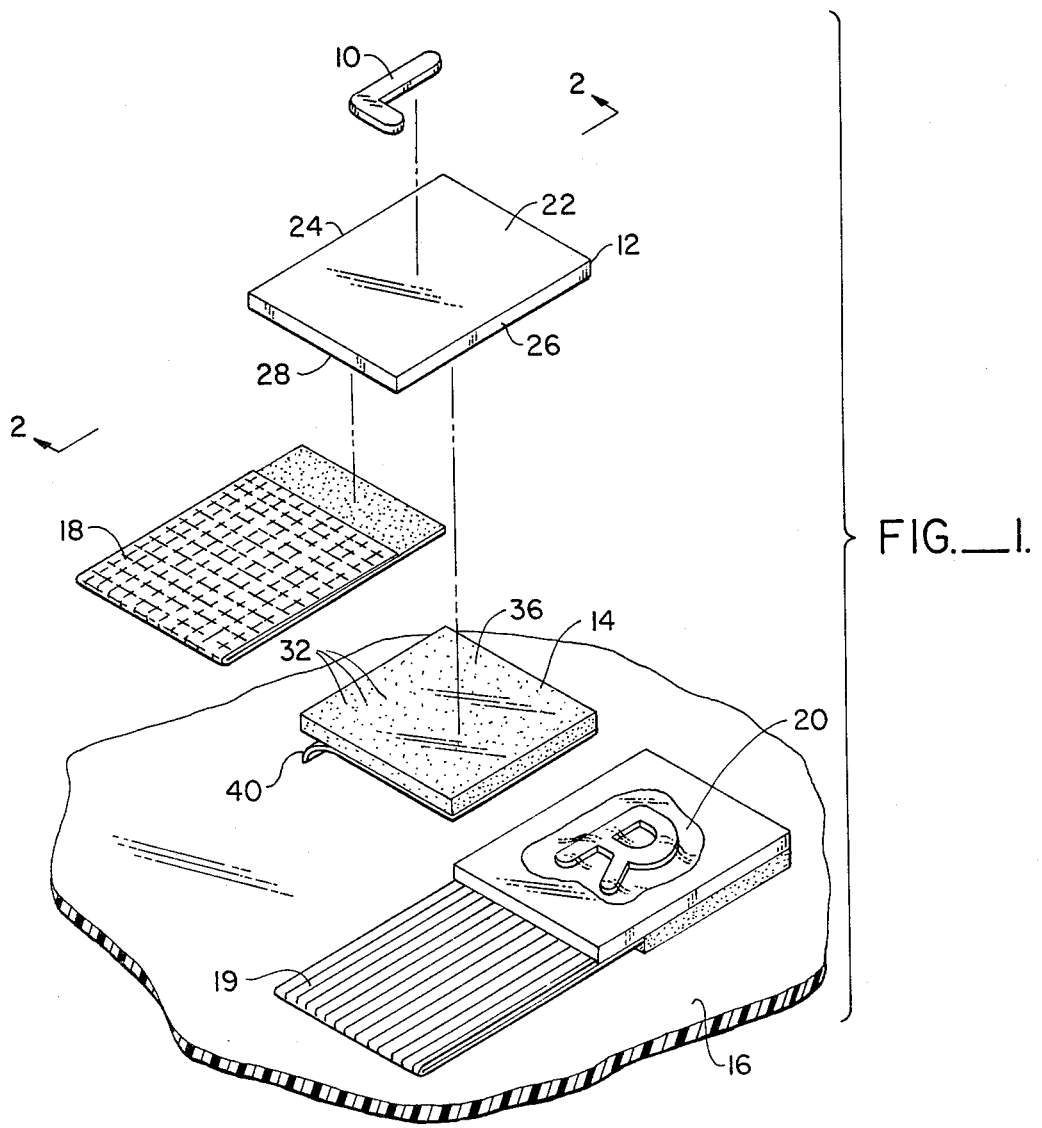
FIG._1.
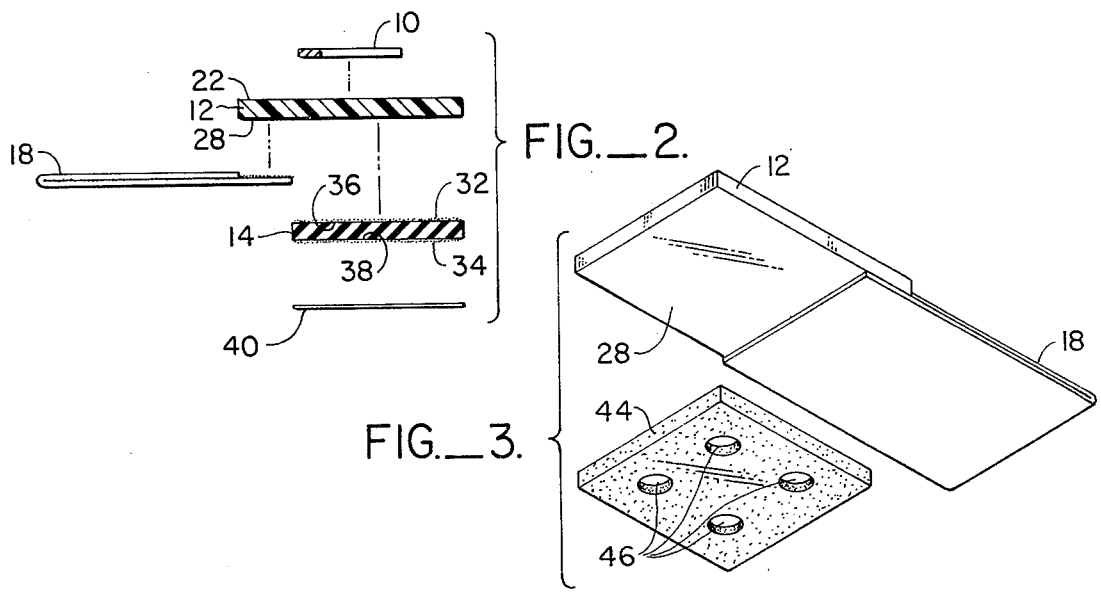
FIG._2.
FIG._3.

APPARATUS FOR THE MARKING OF X-RAY FILM

BACKGROUND OF THE INVENTION

This invention relates to devices for imprinting identifying characters on exposed X-ray film, and more specifically to devices having indicia constructed of X-ray shielding material and which are self-adhering to any structure interposed between the source of X-rays and the X-ray film.

As is well known, certain materials, e.g. lead, are impermeable or opaque to X-rays. If such material is placed between the source of X-rays and the unexposed X-ray film, the film will upon exposure reveal a clear or transparent mark in the position where the X-ray shielding material was located.

It is often desirable to provide permanent identifying marks or characters, e.g. numbers, letters, and other symbols, on the exposed X-ray film. This practice of applying identifying markings on exposed X-ray film is both common and necessary in the medical field. In many instances, if an X-ray is taken, without the use of identifying characters, of a portion of a patient's body, the X-ray is often useless. Because exposed X-ray film is translucent to light, one side of the exposed film is the mirror image of the other side. For example, if an X-ray is taken of a patient's right hand, it would not be possible without detailed examination to determine whether that exposure was of the right or left hand unless there was a permanent record marked on the exposed X-ray film.

There are no commercially available reusable devices for applying identifying characters to exposed X-ray film. In conventional practice, the X-ray film is placed into an X-ray transparent or permeable film cassette in a dark room. The cassette is then taken out of the dark room and placed into a holder aligned with the X-ray source. When it is desired to make a permanent record on the exposed X-ray film of certain characters, e.g. "right," "anterior," "oblique," or any other type of identifying symbol, lead indicia are placed on the cassette and taped thereto, usually by adhesive tape which is readily available in hospitals and doctors' offices.

This conventional practice provides several disadvantages, the most obvious of which is that after the tape has been placed over the lead indicia and secured to the cassette, it is not possible to read the character that has been taped to the cassette. Accordingly, mistakes are frequently made which often lead to disastrous results when the exposed X-ray is then examined with improper markings on it. Another disadvantage of the conventional practice is that it is both time consuming and difficult to hold the lead indicia onto the normally vertically aligned cassette while the adhesive tape is cut and placed over the lead indicia. Furthermore, it is not possible to place multiple indicia in straight alignment with one another, for example when it is desired to spell particular words, because of the overlapping adhesive tape required for each individual letter.

U.S. Pat. Nos. 4,015,352 and 2,069,286 disclose self-adhesive indicia. U.S. Pat. No. 3,453,761 discloses three-dimensional plastic indicia which may be secured to a surface by pressure-sensitive adhesive.

SUMMARY OF THE INVENTION

The present invention solves the problems inherent in applying identifying markings to exposed X-ray film by providing film marking devices which are self-adhesive to the film cassette, self-aligning with adjacent marking devices and readily removable for reuse.

The present invention is a device generally comprising indicia of X-ray shielding material, a supporting sheet of X-ray permeable material connected to the indicia, and means connected to the supporting sheet for releasably securing the supporting sheet and indicia to any suitable structure located between the source of X-rays and the X-ray film. Also provided on the device are means for easily removing the device once it has been secured, e.g. a flexible tab connected to the support sheet.

The indicia of the present invention are letters, numbers, and any other symbols used in the particular field for which X-rays are required, e.g. the medical field. One such symbol in common use in the medical field is an arrow which is placed on the film cassette adjacent the location of a suspected tumor or broken bone to facilitate locating the tumor or broken bone on the subsequently developed X-ray film. Common letters or combination of letters representative of those used in the medical field are "R" denoting "right", "L" denoting "left", "EVAC" denoting "evacuation", "ANT" denoting "anterior", "OBL" denoting "oblique", "EXT" denoting "extension", and "FLEX" denoting "flexion."

The X-ray impermeable indicia are rigidly secured, e.g. cemented or bonded, to an X-ray permeable support sheet having a generally rectangular shape. The rectangular configuration of the support sheet allows multiple indicia to be accurately aligned adjacent one another when they are placed on the cassette.

The support sheet has the lead indicia bonded to its upper surface. Secured to the lower surface of the support sheet is a thin generally planar shaped pad having a coating of pressure-sensitive adhesive on its two faces. The upper face of the pad is connected to the lower surface of the support sheet by the pressure-sensitive adhesive coating. The lower face of the pad is secured to the cassette or other structure by means of the pressure-sensitive adhesive coating. Prior to application of the device to the cassette, the lower face of the pad is covered by a backing to protect the pressure-sensitive adhesive coating on the lower face. When the adhesive coating on the lower face of the pad becomes dirty or otherwise loses its adhesive qualities with repeated use, the pad is removed from the support sheet by peeling it off the lower surface of the support sheet. A new pad is then applied to the support sheet.

Means connected to the support sheet are provided for easily removing the device once it has been adhered to the cassette or other structure. Preferably this is a flexible tab, which may be color coded, which extends outwardly from the support sheet.

In use, the protective backing is removed from the lower face of the pad and the device is placed where desired. A slight tap with the finger will secure the device because of the pressure sensitive adhesive quality of the coating on the lower face. Because the upper face of the pad has been secured to the lower surface of the support sheet under much greater pressure than that used to apply the device to the cassette, and further because the lower surface of the support sheet is relatively clean and smooth, the adhesive force connecting the pad to the support sheet is significantly greater than the adhesive force between the lower face of the pad and the cassette or other structure. When it is desired to remove the device the flexible tab connected to the support sheet is grasped and lifted upward thereby breaking the seal between the lower face of the pad and the structure. Because each of the support sheets has a generally rectangular structure, indicia may be easily aligned adjacent to one another.

The novel features which are believed to be characteristic of the invention, together with objects and advantages thereof, will be better understood from the following description considered in connection with the accompanying drawings in which preferred embodiments of the invention are illustrated by the way of example. It is to be expressly understood, however, that the drawings are for the purpose of illustration and description only and are not intended as a definition of the limits of the invention.

BRIEF DESCRIPTION OF THE DRAWINGS

FIG. 1 is an exploded view illustrating the various components of the invention.

FIG. 2 is a view of section 2—2 of FIG. 1.

FIG. 3 is a bottom view of an alternative embodiment of the invention.

DESCRIPTION OF THE PREFERRED EMBODIMENTS

The various components of the X-ray film marking device are illustrated in FIG. 1 and include an indicia 10, a supporting means, e.g. a support sheet 12, for the indicia 10, a pad 14 for releasably securing both the support sheet 12 and the indicia 10 to any X-ray permeable structure such as a portion of a film cassette 16, and gripping means, e.g. a flexible tab 18, connected to the support sheet 12 for facilitating removal of the device from the cassette.

The indicia 10 is constructed of X-ray shielding material, preferably lead, and is the outermost portion of the device when the device is placed upon any X-ray permeable structure which is interposed between the source of X-rays and the X-ray film. The indicia 10 is rigidly secured, such as by a layer of cement 20, to the upper surface 22 of the support sheet 12.

The supporting means to which the indicia 10 is permanently bonded is preferably constructed of a relatively thin sheet of polyvinyl chloride. This material is permeable or transparent to X-rays and thus produces no markings on the X-ray film when the exposed film is subsequently developed. The relatively thin support sheet 12 is preferably rectangularly shaped so that it has relatively straight side edges 24 and 26. Such a rectangular construction with straight side edges 24 and 26 permits alignment of adjacent X-ray film marking devices so that multiple indicia can be aligned to spell out any desired word or abbreviation. The sheet 12 has an upper surface 22, to which the indicia 10 is permanently bonded by a layer of cement 20, and a smooth lower surface 28.

A releasable securing means, such as pad 14, has thin layers of pressure-sensitive adhesive coatings 32 and 34 on respective upper and lower faces 36 and 38. The pressure-sensitive adhesive coatings 32 and 34 on pad 14 permit the pad to readily adhere both to the lower surface 28 of sheet 12 and to the cassette 16. The pad 14 is preferably constructed of a non-rigid generally flexible material, such as a vinyl material, so that the lower face 38 and the adhesive coating 34 thereon conform to the surface to which the device is applied.

The pressure-sensitive adhesive coating 34 on the lower surface 38 of the pad is protected by a backing 40 constructed of any suitable material, e.g. paper, for preventing debris from contacting the coating 34 prior to application of the marking device to the film cassette 16.

It should be apparent that pad 14 is secured to the lower surface 28 of support sheet 12 prior to application of the device to the cassette 16. Because the pad 14 is applied to the support sheet by firm pressure and because the lower surface 28 of sheet 12 is smooth and generally free of dirt and other debris, the adhesive force which secures the upper face 36 of pad 14 to the lower surface 28 of the sheet 12 is considerably greater than the adhesive force which secures the pad 14 to the cassette 16. Thus when it is desired to remove the device from the cassette 16, the flexible tab 18 is grasped and lifted upward. This breaks the adhesive force between the lower face 38 of pad 14 and the cassette 16 and removes the device intact, without disturbing adhesion between pad 14 and sheet 12.

A gripping means, such as flexible tab 18, is connected to the device and preferably to the support sheet 12. The tab 18 is bonded to the lower surface 28 of sheet 12 so that then the device is adhered to the cassette 16, the flexible tab 18 is raised above the surface of the cassette facilitating gripping the tab 18. Each of the tabs is of a predetermined color for easy association of a colored tab with a particular indicia, thereby facilitating application and removal of the device to the film cassette 16. In the preferred embodiment, the letter "L," which denotes "left," has associated with it a flexible tab 18 of a yellow color. The letter "R," which denotes "right," has associated with it a flexible tab 19 of a red color. The use of color coded flexible tabs with frequently used indicia, such as "L" and "R," facilitates the use of these indicia as X-ray film marking devices which results in a saving of X-ray technicians' time.

An alternative embodiment of the pad, as illustrated in FIG. 3, is a pad 44 having a plurality of openings 46. As will be discussed herein, the combination of these openings and the characteristic flexibility of the pad 44 increases adherence of the device by providing a partial vacuum between sheet 12 and cassette 16.

The invention as thus described can be better understood by considering the function of the component parts when the X-ray marking device is in use. Prior to application of the device to the cassette 16, or to any other X-ray permeable structure which may be interposed between the X-ray source and the film, the protective backing 40 is removed from the lower surface 38 of the pad 14, thereby revealing the layer of adhesive coating 34. The device is then grasped either by the flexible tab 18, but preferably by the side edges 24 and 26 of the support sheet, and placed on the cassette 16 where desired. A slight tap on the top of the device, i.e. on the indicia 10, applies pressure to the pressure-sensitive adhesive coating 34 and causes the pad to generally conform to the surface of the cassette 16. The indicia is now releasably secured on the cassette 16 where desired.

Should it be desired to place multiple indicia adjacent one another on the cassette 16, this is facilitated by the generally straight side edges 24 and 26 of each of the devices. The devices are aligned by abutting their respective straight side edges to one another, thereby creating a straight alignment of the indicia.

The pad 44 shown in the alternative embodiment in FIG. 3 increases the adhering force between the support sheet 12 and the cassette 16 in the following manner. This embodiment of the invention is constructed as in the preferred embodiment with the exception that the pad 44 has a plurality of openings 46. As the pad is pressed onto the cassette, air is pushed out of these openings. Thus when pressure is removed from the device, a partial vacuum is thereby created between the sheet 12 and the cassette 16 to enhance adhesion of the device to the cassette 16.

When the X-ray marking device is releasably secured to any X-ray permeable or transparent structure between the X-ray source and the X-ray film, and the X-ray film subsequently exposed to X-rays, a marking corresponding to the indicia on the device will appear on the X-ray film when the film is developed. These markings appear on the developed X-ray film because the indicia are constructed of X-ray shielding material, such as lead, and all other components of the invention are permeable to X-rays.

It should also be especially noted that because the pad 14 has pressure-sensitive adhesive coating 32 on its upper face 36, the pad may be easily removed from the support sheet 12 and replaced by a new pad when desired. This is important when, after frequent use, the adhesive coating 34 on the lower face of the pad 14 becomes dirty or otherwise unusable.

While the preferred embodiments of the present invention have been illustrated in detail, it should be apparent that modifications and adaptations of those embodiments will occur to those skilled in the art. However, it is to be expressly understood that such modifications and adaptations are within the sphere and scope of the present invention as set forth in the following claims.

What is claimed is:

1. A device for marking X-ray film with identifying characters, the film being held prior to exposure in a cassette of non-X-ray shielding material, said device comprising:
   indicia of X-ray shielding material;
   means rigidly secured to said indicia for supporting said indicia;
   means for releasably securing said supporting means and therewith said indicia to the cassette; and
   a generally flexible tab connected to said supporting means and extending outwardly therefrom for facilitating the removal of said supporting means and therewith said indicia from the cassette.

2. The device according to claim 1 wherein the indicia are constructed of lead.

3. The device according to claim 1 wherein said supporting means is a relatively thin sheet of polyvinyl chloride.

4. The device according to claim 1 wherein said tab is a predetermined color.

5. The device according to claim 1 wherein said pad is a vinyl material.

6. The device according to claim 1 wherein said releasably securing means has a plurality of holes extending throughout its thickness for providing a partial vacuum between said supporting means and the cassette to thereby enhance the securing of said supporting means and therewith said indicia to the cassette.

7. The device according to claim 6 wherein said releasably securing means has a coating of pressure-sensitive adhesive on its upper surface for removably connecting said pad to said supporting means.

8. A device for selectively shielding X-rays from X-ray film during exposure so as to imprint identifying indicia on the X-ray film, the device being attachable to X-ray permeable structure between the X-ray source and film, the device comprising:
   indicia of a relatively thin layer of lead;
   a generally planar relatively thin support sheet constructed of X-ray permeable material and having an upper surface to which said indicia are bonded and a lower surface;
   a generally planar relatively thin pad having an upper face coated with an adhesive substance for removably connecting said pad to the lower surface of said sheet, and a lower face coated with an adhesive substance for releasably securing said pad and therewith said sheet and indicia to said X-ray permeable structure; and
   a generally flexible tab connected to said sheet for facilitating the removal of the device from said X-ray permeable structure.

9. The device according to claim 8 including a backing for protecting the adhesive substance on said lower face of said pad prior to the application of the device to said X-ray permeable structure.

10. The device according to claim 8 wherein said sheet is constructed of polyvinyl chloride.

11. The device according to claim 8 wherein said tab is a predetermined color.

12. The device according to claim 11 wherein said indicia is an "R" and wherein said tab is a red color.

13. The device according to claim 11 wherein said indicia is an "L" and wherein said tab is a yellow color.

14. A device for marking X-ray film with identifying characters, the film being held prior to exposure in a cassette of non-X-ray shielding material, said device comprising:
   indicia of X-ray shielding material;
   means rigidly secured to said indicia for supporting said indicia; and
   a relatively thin, generally planar pad releasably secured to said supporting means having a coating of pressure-sensitive adhesive on its lower surface, said pad also having a plurality of holes extending throughout its thickness for providing a partial vacuum between said supporting means and the cassette to thereby enhance the securing of said supporting means and therewith said indicia to the cassette.

* * * * *